United States Patent [19]
Sakalian et al.

[11] Patent Number: 5,056,119
[45] Date of Patent: Oct. 8, 1991

[54] ADAPTIVE FRAME RESYNCHRONIZER APPARATUS

[76] Inventors: Steve Y. Sakalian, 3222 Shield La., Garland, Tex. 75044; Jeffrey L. Zwiebel, 6756 Hillbriar Dr., Dallas, Tex. 75248

[21] Appl. No.: 462,162
[22] Filed: Jan. 8, 1990
[51] Int. Cl.$^5$ .......................... H04L 7/06; H04J 3/06
[52] U.S. Cl. .................................. 375/106; 375/108; 375/107; 370/105.1
[58] Field of Search ............... 375/106, 107, 108, 114, 375/116; 370/105.1, 105.4, 106

[56] References Cited

U.S. PATENT DOCUMENTS

| | | | |
|---|---|---|---|
| 4,763,324 | 8/1988 | Schwierz | 370/105.1 |
| 4,768,192 | 8/1988 | Pattavina et al. | 370/105.1 |
| 4,788,681 | 11/1988 | Thomas et al. | 370/105.1 |
| 4,794,626 | 12/1988 | Tanabe et al. | 370/105.1 |

*Primary Examiner*—Douglas W. Olms
*Assistant Examiner*—Ralph Smith

[57] ABSTRACT

A frame synchronization circuit is illustrated, which uses an algorithm of reverting to an initial state of selecting the next logic zero data bit in a data bit stream for the potential bit position to be used as a framing bit, and returning to reinitialization if any of the next M-bits in that bit position do not follow a prescribed framing pattern. Once synchronization is established, the detection of three out of five framing bits being in error will cause the circuit to return to an intermediate state in the framing process, whereby any further errors in the next X number of bits will cause reinitialization, but the lack of any further errors in the next X-bits will allow the circuit to confirm that its original bit position choice as framing bit was correct. This allows the circuit to continue operation with the assurance that it is correctly synchronized with the data, and without interrupting data flow for the comparatively long time it takes to synchronize from "scratch".

9 Claims, 2 Drawing Sheets

ADAPTIVE FRAME RESYNCHRONIZER APPARATUS

THE INVENTION

The present invention is generally related to electronics, and more specifically related to data received from a remote location, where it is essential that synchronization be not only quickly established, but that the circuit not be fooled into believing that synchronization has been lost merely because a certain number of bits are received in a condition that accurate detection as to their logic value cannot be made.

BACKGROUND

In prior art synchronizers known to the Applicants, the circuit would revert to the complete initialization and resynchronization process when the circuit determined that there may be an out-of-sync condition. The complete resynchronization process could entail many false starts in selecting all the given logic value or logic zero condition data bits, and checking through enough following frames of data bits to establish whether or not the selected bit position coincides with the actual framing bit.

The present invention, in one embodiment, reverts to an intermediate or confirmation frame sync state whenever three of the most recently received five data bits in the selected framing bit position indicate that the received data bits do not follow the prescribed pattern. When in the intermediate framing bit stage, any further errors in receipt of bits will immediately return the circuit to reinitialize and select a new tentative framing bit position. On the other hand, if enough consecutive framing bits are received having the logic value of the prescribed pattern, the circuit is returned to an established synchronization condition where it will require an additional three out of five bits in error to cause the circuit to determine that there are new signal reception problems.

In other words, the present circuit operates on the principle that if five consecutively received bits in the selected framing bit position follow a predetermined pattern that the correct data bit position has been established. If three out of five later received bits are detected as being incorrect, (after synchronization has been established) it may be assumed that the problem is not in the selection of the wrong framing bit position, but rather in the transmission medium. If any further data bits are received in the data bit position previously selected as the framing bit position, and these bits are received with incorrect values as compared to the predetermined pattern, it may be safely assumed that a new transmission medium needs to be established and resynchronication needs to be commenced from an initial set of values. On the other hand, if the next several framing bit positions provide the correct logic values, it may be correctly assumed that the interference problem causing the incorrect detection of logic values of data bits was a momentary occurrence and that in spite of the interference, synchronization with the transmitter has not actually been lost and thus there is no need to return to the very time consuming process of reestablishing synchronization from "scratch". As will be realized, under the worst possible conditions where there are many logic zero bit positions between framing bits, and where the framing bits alternate in logic value, it could take a large amount of time equal to the time of transmission of many data frames to establish the correct data bit position for the framing bit. Thus, it is very advantageous to temporarily return to the confirmation mode where possible, and reestablish that the correct bit position was selected and is still valid rather than returning to the selection mode to reestablish synchronization.

It is therefore an object of the present invention to provide a synchronization circuit and algorithm which quickly establishes synchronization and can reconfirm synchronization under temporarily adverse conditions.

Other objects and advantages will be apparent from a reading of the specification and appended claims in conjunction with the drawings wherein:

FIG. 1 is a schematic block diagram of one embodiment of the inventive concept; and FIG. 2 is a state diagram used in explaining the algorithm followed in the design of FIG. 1, wherein the algorithm was reduced to practice.

DETAILED DESCRIPTION

Figure 1:
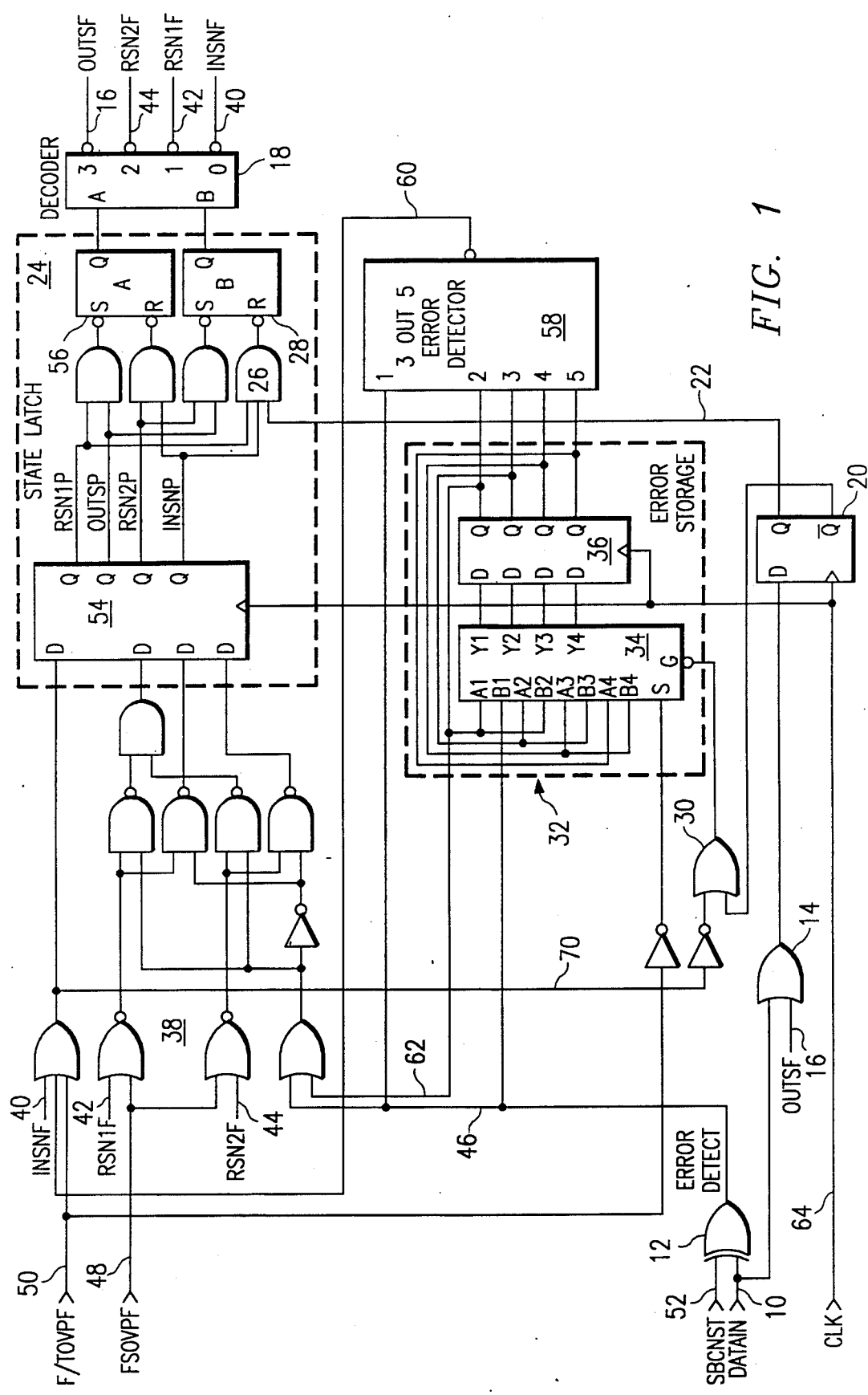

In FIG. 1, input data is supplied on a lead 10 to an exclusive OR-gate 12 and to an OR-gate 14. OR-gate 14 receives an additional input 16, which is labeled OUTSF, (out-of-sync false) and comprises one of the outputs of a decoder block 18. The output of OR-gate 14 is supplied to a D flip-flop 20 which provides an output on a lead 22 to a state latch circuit, generally designated as 24 and containing an AND gate 26. An output of AND gate 26 is applied to a B state flip-flop 28 also within latch circuit 24, and an output of flip-flop 28 is supplied to a B input of decoder 18. A further Q bar output of flip-flop 20 is supplied to an OR-gate 30 which provides an input to an error storage block, enclosed in dash lines and designated as 32. Within block 32 is a first memory storage block 34 and a set of D flip-flops designated as 36. A set of OR, NOR, AND and NAND gates is generally designated as 38. The set of gates 38 receive state signals from decoder 18 on leads 40, 42 and 44 as shown. This set of logic gates also receives an output of error detecting exclusive OR-gate 12 on a lead 46. In addition, a first subframe overhead pulse signal is received on a lead 48 and a subframe pulse signal indicative of the first and third subframes is received on lead 50. A lead 52 provides counter state signals to gate 12 wherein the lead 52 is in a logic zero state during the first two subframes and is otherwise a logic 1. All the outputs of the logic gates 38 are supplied to a set of D flip-flops generally designated as 54 within state latch 24. The outputs of these gates 54 are supplied through a plurality of AND gates to the B flip-flop 28 and to an A flip-flop 56. An output of A flip-flop 56 is supplied to an A input of decoder 18. A three-out-of-five error detector block 58 receives a signal indicative of the correctness of the logic level in the presently selected framing data bit position on lead 46, as well as information on the correctness of the data bits for the last four or most recent four framing bit positions from the error storage block 32. The information on the most recent history for correctness of error bits is provided on a lead 60 to the set of logic gates 38. Finally, a clock signal is provided on a lead 64 to flip-flop 20, the set of D flip-flops 36 and the set of D flip-flops 54.

Figure 2:
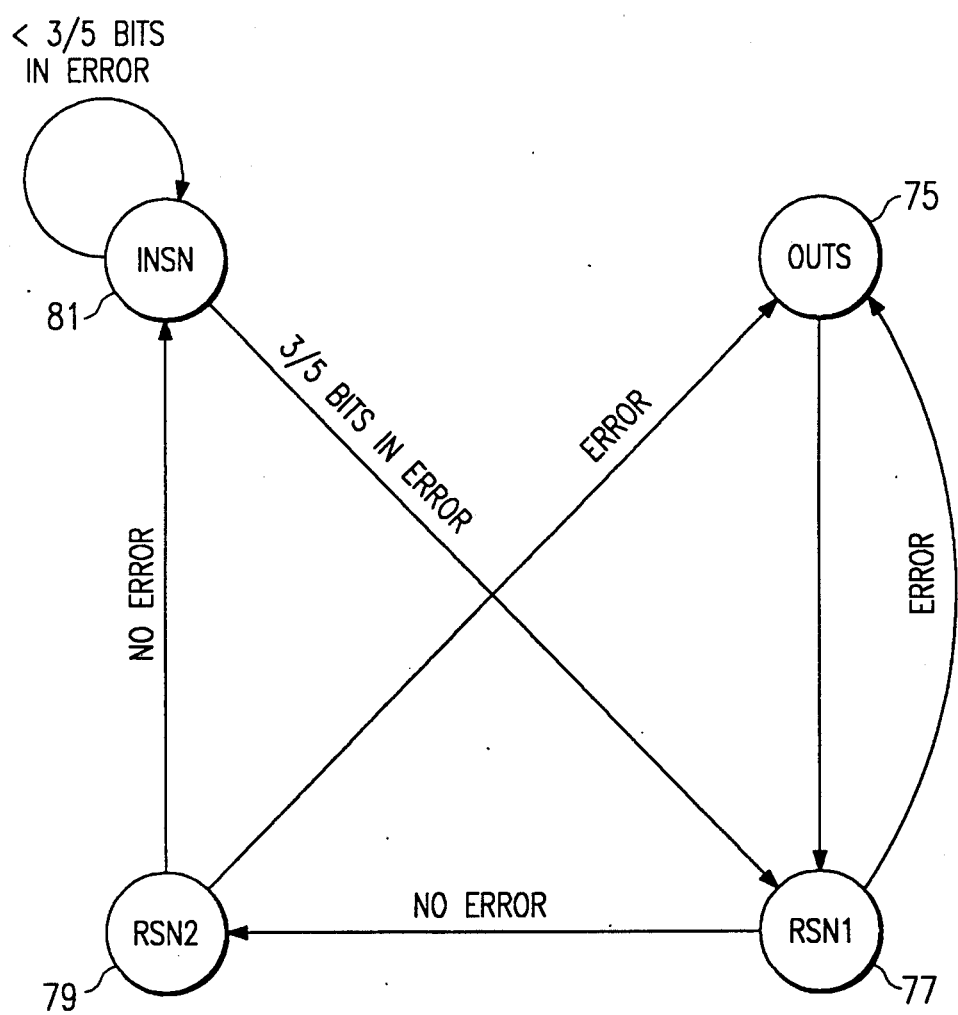

FIG. 2 represents a type of flow diagram representation where the flow starts with the circuit being out of sync in state OUTS given a designation of 75. The circuit proceeds to resynchronization state No. 1 (RSN1)

given a designation of 77. If while in state 77, any errors are discovered, the circuit immediately returns to state 75 and selects the next logic zero in the data stream, and upon finding same, returns to state 77. After a prescribed number of correctly received data bits, the state is incremented to state 2 and the system proceeds to block 79 which is labeled RSN2. In the embodiment of the invention shown, the framing bit alternates between logic zero and logic one and state 77 only determines the correctness of one pair of logic one-logic zero framing bit occurrences before continuing to resynchronization state No. 2. If, within the next two framing bit positions an error is detected, the system will again return to state 75 and attempt to find the next logic zero in the data stream and again proceed through state 77 and 79. If, on the other hand, a further pair of data bit positions are found to contain the correct data pattern, it is concluded that there is no error and the system proceeds from state 79 to an in-sync condition (INSN) state 81. Once it is in state 81, the history is examined and the system will stay in an in-sync condition as long as there are less than three bits ascertained as being in error in the selected framing bit position. Once three out of the most recent five bits are ascertained as being in error the system returns to resynchronization state 77 in an attempt to confirm synchronization without reinitializing and any further errors detected before returning to in-synchronization state 81 will cause the system to return to out-of-sync state 75 and look for a logic zero in a different bit position to reestablish synchronization. If, on the other hand, the next three or four received framing bits (depending upon the logic level at the time of returning to state 77) are correctly detected, the system will proceed to the in-synchronization state 81, and continue as if there had been no data loss from a system synchronization standpoint. The coding involved within a message will prevent the "faulty" data received at the times that the questionable sync signals were received from being declared valid by the system, but at least the system does not have to wait before receiving further data until the entire resynchronization process is started from "scratch" to resynchronization.

OPERATION

Although the algorithm used in the present invention is believed different and novel, it is very straightforward once postulated. When the circuit starts up or finds enough errors to return to the initialization state 75, the circuit checks the data stream for the next logic zero that occurs. Upon finding a logic 0, it tentatively classifies this data bit position as a framing bit position and goes to state 77. (The particular framing bit pattern used in this inventive embodiment comprises alternating logic 1's and logic zero's.) If either of the next two frame bits do not meet the prescribed pattern, the system returns to state 75 and checks for the next logic zero bit. However, if the two frame bits checked in state 77 are correct, it proceeds to state 79 as further confirmation of finding the correct framing bit position, and if there is an error in either of the next two framing bit position, the system again returns to the out-of-sync condition 75 and starts again from scratch. However, if the next two received bits at the potential framing bit position are correct, the system proceeds to the in-sync state 81. Once the system is in the in-sync condition, it requires errors in at least three out of the most recently received five frame bits to declare that potentially there is a loss of synchronization. Once three out of five bits are found to be in error, the system returns to state 77. If either of the next two received logic bits are in error, the system decides that it needs to recommence the synchronization process and returns to state 75. However, if these two bits are received correctly, the system temporarily assumes that there was merely interference in the reception of the data and that the system is probably still in synchronization. If the next two bits are correctly received in state 79, there is confirmation that the system was still in synchronization and the system returns to state 81. In this way a short burst of bad data does not cause the initialization process to be started from scratch. This is very desirable since starting from scratch can involve a great number of trials of bit positions before finding the correct one. With the present process, the system is confirmed as being in sync with only an additional five frames after the series of three error bits out of five are detected in state 81.

It may be noted that upon proceeding to state 77 either from the state 75 or state 81, a memory in block 32 is cleared and used for the purpose of detecting whether or not any of the logic bits are in error as the system proceeds towards state 81. Once the system is in state 81, the detection logic is altered to only cause a change of states when three out of five bits are in error.

As will be realized by those skilled in the art, there are many ways of implementing the algorithm of FIG. 2 and FIG. 1 is merely one of the approaches that could be used. In FIG. 1, the data is received on line 10. The lead 50 provides a false signal on the occurrence of each first and third subframe overhead pulses. The lead 48 provides a false signal whenever the first subframe overhead pulse occurs. Lead 52 is connected to a subframe counter which is logic zero during the first two subframes and is a logic one otherwise and this set of logic levels in combination with the exclusive OR-gate 12 is used for error detection, both within the logic circuit 38 and the memory or error storage circuitry 32. The memory storage is cleared either by a signal from the OR-gate 14 through D flip-flop 20 to OR-gate 30 when the algorithm is proceeding from state 75 to 77 or from the lead 70 which is activated by an output from the three out of five error detector 58. The logic circuitry 38 operates to check the errors occurring in any of the states and operates the state latch 24 to provide a combination of logic 1's and logic 0's from flip-flops 28 and 56. The decoder 18 provides output signals on leads 16, 40, 42 and 44 as an indication of each of the states from initialization through confirmation to synchronization.

While we have disclosed a single circuit for implementing the algorithm of FIG. 2 involving a specific pattern for the framing bit logic, and which circuit operates to provide synchronization after two stages of confirmation and then further returns to confirmation after three out of five errors are detected, we do not wish to be limited only to these specifics, but rather to the concept as recited in the appended claims wherein:

We claim:

1. Frame synchronization apparatus comprising, in combination;
   A. synchronization state first means for providing an output indicative of one of four possible states of synchronization of the apparatus where state 1 is no synchronization, state 4 indicates an in-sync condition and states 2 and 3 are indicative of intermediate states in an attempt to establish synchronization;

B. data stream supplying second means for supplying a data bit stream comprising logic ones and logic zeros and including a synchronization framing bit position which occurs every Nth bit position with the logic value of this bit position having a predetermined pattern;

C. resettable storage third means, connected to said second means, for storing data indicative of the correctness of the logic value of data bits received each Nth framing bit;

D. detection fourth means, connected to said first, second and third means, for alternatively either;

(a) finding the next data bit in the data bit stream having a logic zero, resetting said third means to a cleared condition and then altering said first means to state 2 from a state 1 condition when said fourth means detects that said first means is in a state 1 condition, (b) checking each Nth data bit for first a logic one and then a logic zero value, supplying signals to said third means as to the correctness of the logic value of each received Nth data bit and then, exclusively (i) altering said first means to a state 1 condition if either Nth data bit is of the wrong logic value and reinitializing the detection process, or (ii) altering said first means to state 3 from a state 2 condition when said fourth means detects that said first means is in a state 2 condition and both received Nth data bits are of the correct logic value, or (c) checking each Nth data bit for first a logic one and then a logic zero value, supplying signals to said third means as to the correctness of the logic value of each received Nth data bit and then, exclusively (i) altering said first means to a state 1 condition if either Nth data bit is of the wrong logic value and reinitializing the detection process, or (ii) altering said first means to state 4 from a state 3 condition when said fourth means detects that said first means is in a state 3 condition and both received Nth data bits are of the correct logic value; and (d) detection fifth means, connected to said first, second, third and fourth means, for checking each Nth data bit for alternating logic values, supplying signals to said third means as to the correctness of the logic value of each received Nth data bit and when said fifth means detects that the data stored by said third means indicates that three out of the last five Nth data bits do not comply with the predetermined logic value pattern, altering said first means to a state 2 condition and resetting said third means to a cleared condition.

2. The method of establishing and maintaining an indication of synchronization with a desired framing bit in a received data stream where the framing bit is known to occur every Nth data bit and is known to occur in a predetermined pattern comprising the steps of:

A. establishing a changeable state condition which is changeable between states 1 and 4 in accordance with predetermined sets of events;

B. checking the data stream for the next occurrence of a logic zero data bit as the next potential framing bit position whenever there is a state 1 condition and upon finding a logic zero data bit, (a) changing to state 2, (b) reinitializing a recorder of the correctness of received data bits for each Nth data bit after detection of a logic zero in Step B;

C. checking the data stream for the next J occurrences of an Nth data bit and upon finding same, (a) returning the state condition to state 1 if a Nth data bit is of the wrong logic value and returning to step B, (b) altering the state condition to state 3 after receiving a predetermined number of Nth data bits of the correct logic value;

D. checking the data stream for the next J occurrences of an Nth data bit and upon finding same, (a) returning the state condition to state 1 if a Nth data bit is of the wrong logic value and returning to step B, altering the state condition to state 4 after receiving a predetermined number of Nth data bits of the correct logic value;

E. maintaining a history of the correctness of logic value of the data bit in each framing bit position (each Nth data bit); and F. changing the state from state 4 to state 2 and returning to step B whenever the history indicates that X of the last Y data bits are not of the correct logic value where X and Y are positive integer values.

3. The method of claim 2 comprising the additional step of reinitializing the recorder of the correctness of received data bits as a part of changing from state 4 to state 2 in step F.

4. Apparatus for establishing and maintaining an indication of synchronization with a desired framing bit in a received data stream where the framing bit is known to occur every Nth data bit and is known to occur in a predetermined pattern comprising, in combination:

A. first means for establishing a changeable state condition which is changeable between states 1 and 4 in accordance with predetermined sets of events;

B. second means, connected to a data stream source and to said first means, for checking the data stream for the next occurrence of a logic zero data bit as the next potential framing bit position whenever there is a state 1 condition and upon finding a logic zero data bit, (a) changing to state 2, (b) reinitializing a recorder of the correctness of received data bits for each Nth data bit after detection of a logic zero in step B;

C. third means, connected to the data stream source and to said first means, for checking the data stream for the next J occurrences of an Nth data bit and upon detecting same, (a) returing the state condition to state 1 if any of the detected data bits are of the wrong logic value and returning control to said second means of step B, (b) altering the state condition to state 3 after receiving a predetermined number of Nth data bits of the correct logic values;

D. fourth means, connected to the data stream source and to said first means, for checking the data stream for the next J occurrences of an Nth data bit and upon detecting same (a) returning the state condition to state 1 if any of the detected data bits are of the wrong logic value and returning control to said second means of step B,
(b) altering the state condition to state 4 after receiving a predetermined number of Nth data bits of the correct logic value;

E. fifth means, connected to the data stream source and to said first means, for maintaining a history of the correctness of logic value of the data bit in each framing bit position (each Nth data bit); and F. sixth means, connected to said fifth means and to said first means, for changing the state from state 4 to state 2 and returning to step B whenever the history indicates that X of the last Y data bits are not of the correct logic value where X and Y are positive integer values.

5. Frame synchronization apparatus comprising, in combination;

synchronization state first means for providing an output indicative of one of four possible states of synchronization of the apparatus where state 1 is no synchronization, state 4 indicates an in-sync condition and states 2 and 3 are indicative of intermediate states in an attempt to establish synchronization;

B. data stream supplying second means for supplying a binary logic value data bit stream and including a synchronization bit position which occurs every Nth bit position with the logic value of this bit position having a predetermined pattern;

C. resettable storage third means, connected to said second means, for storing data indicative of the correctness of the logic value of data bits received each Nth framing bit in accordance with said predetermined pattern;

D. detection fourth means, connected to said first, second and third means, for alternatively either,
(a) finding the next data bit in the data bit stream having a predetermined given logic value, resetting said third means to a cleared condition and then altering said first means to state 2 from a state 1 condition when said fourth means detects that said first means is in a state 1 condition,
(b) checking each further received Nth data bit for complying with the logic value of said predetermined pattern for M data bits, where M is a positive integer number, supplying signals to said third means as to the correctness of the logic value of each received Nth data bit and then, exclusively
 (i) altering said first means to a state 1 condition if any received Nth data bit is of the wrong logic value and reinitializing the detection process, or
 (ii) altering said first means to state 3 from a state 2 condition when said fourth means detects that said first means is in a state 2 condition and all M received Nth data bits are of the correct logic value, or
(c) checking each further received Nth data bit for complying with the logic value of said predetermined pattern for P data bits, where P is a positive integer number, supplying signals to said third means as to the correctness of the logic value of each received Nth data bit and then, exclusively
 (i) altering said first means to a state 1 condition if any received Nth data bit is of the wrong logic value and reinitializing the detection process, or
 (ii) altering said first means to state 4 from a state 3 condition when said fourth means detects that said first means is in a state 3 condition and all P received Nth bits are of the correct logic value; and E.
(d) detection fifth means, connected to said first, second, third and fourth means, for checking each Nth data bit for compliance with said predetermined pattern of logic values, supplying signals to said third means as to the correctness of the logic value of each received Nth data bit and when said fifth means detects that the data stored by said third means indicates that a predetermined number of a larger predetermined number of the most recently received Nth data bits do not comply with the predetermined logic value pattern, altering said first means to a state 2 condition.

6. Frame synchronization apparatus comprising, in combination;

A. synchronization state first means for providing an output indicative of one of a least three possible states of synchronization of the apparatus where state "alpha" is no synchronization, state "omega" indicates an in-sync condition and there is at least one intermediate state "beta" used in an attempt to establish synchronization;

B. data stream supplying second means for supplying a binary logic value data bit stream and including a synchronization bit position which occurs every Nth bit position with the logic value of this bit position having a predetermined pattern;

C. resettable storage third means, connected to said second means, for storing data indicative of the correctness of the logic value of data bits received each Nth framing bit in accordance with said predetermined pattern;

D. detection fourth means, connected to said first, second and third means, for alternatively either,
(a) finding the next data bit in the data bit stream having a predetermined given logic value, resetting said third means to a cleared condition and altering said first means to state "beta" from a state "alpha" condition when said fourth means detects that said first means is in a state "alpha" condition.
(b) checking each further received Nth data bit for complying with the logic value of said predetermined pattern for M data bits, where M is a positive integer number, supplying signals to said third means as to the correctness of the logic value of each received Nth data bit and then, exclusively
 (i) altering said first means to a state "alpha" condition if any received Nth data bit is of the wrong logic value and reinitializing the detection process, and
 (ii) altering said first means to state "omega" from a state "beta" condition when said fourth means detects that said first means is in a state "beta" condition and all M received Nth data bits are of the correct logic value; and

E.

(d) detection fifth means, connected to said first, second, third and fourth means, for checking each Nth data bit for compliance with said predetermined pattern of logic values, supplying signals to said third means as to the correctness of the logic value of each received Nth data bit and when said fifth means detects that the data stored by said third means indicates that a predetermined number of a larger predetermined number of the most recently received Nth data bits do not comply with the predetermined logic value pattern, altering said first means to a state "beta" condition.

7. Apparatus as claimed in claim 6 wherein;
the predetermined pattern comprises alternating logic values; said fifth means is checking for the occurrence of three error bits out of the most recently received five bits as the predetermined numbers; and said resettable storage third means is reset to a cleared condition when said first means is altered from state "omega" to state "beta".

8. The method of establishing and maintaining an indication of synchronization with a desired framing bit in a received data stream where the framing bit is known to occur every Nth data bit and is known to occur in a predetermined pattern comprising the steps of:
  A. establishing a changeable state condition which is changeable between states "alpha", "beta" and "omega" in accordance with predetermined sets of events;
  B. checking the data stream for the next occurrence of a logic zero data bit as the next potential framing bit position whenever there is a state "alpha" condition and upon finding a logic zero data bit,
    (a) changing to state beta,
    (b) reinitializing a recorder of the correctness received data bits for each Nth data bit after detection of a logic zero in step B;
  C. checking the data stream for the next J occurrences of an Nth data bit and upon finding same,
    (a) returning the state condition to state "alpha" of any of the data bits are of the wrong logic value and returning to step B,
    (b) altering the state condition to state "omega" after receiving a predetermined number of Nth data bits of the correct logic value;
  D. maintaining a history of the correctness of logic value of the data bit in each framing bit position (each Nth data bit); and
  E. changing the state from state "omega" to state "beta" and returning to step B whenever the history indicates that X of the last Y data bits are not of the correct logic value where X and Y are positive integer values.

9. Apparatus for establishing and maintaining an indication of synchronization with a desired framing bit in a received data stream where the framing bit is known to occur every Nth data bit and is known to occur in a predetermined pattern comprising, in combination:
  A. first means for establishing a changeable state condition which is changeable between states "selection", "confirmation" and "synchronization" in accordance with predetermined sets of events;
  B. second means, connected to a data stream source and to said first means, for checking the data stream for the next occurrence of a given logic value data bit as the next potential framing bit position whenever there is a state "selection" condition and upon finding said given logic value data bit,
    (a) changing to state "confirmation",
    (b) reinitializing a recorder of the correctness of received data bits for each Nth data bit after detection of the given logic value in step B;
  C. third means, connected to the data stream source and to said first means, for checking the data stream for the next J occurrences of an Nth data bit and upon finding same
    (a) returning the state condition to state "selection" if any of the data bits are of the wrong logic value and returning control to the second means of step B,
    (b) altering the state condition to state "synchronization" after receiving a predetermined number of Nth data bits of the correct logic values;
  D. fifth means, connected to the data stream source and to said first means, for maintaining a history of the correctness of logic value of the data bit in each framing bit position (each Nth data bit); and
  E. sixth means, connected to said fifth means and to said first means, for changing the state from state "synchronization" to state "confirmation" and returning control to said second means of step B whenever the history indicates that X of the last Y data bits are not of the correct logic value where X and Y are positive integer values.

* * * * *